United States Patent
Zhan

(10) Patent No.: US 11,528,220 B2
(45) Date of Patent: Dec. 13, 2022

(54) METHOD AND DEVICE FOR CREATING BI-DIRECTIONAL SEGMENT ROUTING TUNNEL AND STORAGE MEDIUM

(71) Applicant: ZTE CORPORATION, Guangdong (CN)

(72) Inventor: Shuangping Zhan, Guangdong (CN)

(73) Assignee: ZTE CORPORATION, Guangdong (CN)

(*) Notice: Subject to any disclaimer, the term of this patent is extended or adjusted under 35 U.S.C. 154(b) by 118 days.

(21) Appl. No.: 16/963,032

(22) PCT Filed: Jan. 9, 2019

(86) PCT No.: PCT/CN2019/071015
§ 371 (c)(1),
(2) Date: Jul. 17, 2020

(87) PCT Pub. No.: WO2019/141118
PCT Pub. Date: Jul. 25, 2019

(65) Prior Publication Data
US 2020/0351197 A1 Nov. 5, 2020

(30) Foreign Application Priority Data
Jan. 18, 2018 (CN) .......................... 201810050753.1

(51) Int. Cl.
*H04L 45/00* (2022.01)
*H04L 12/46* (2006.01)
(Continued)

(52) U.S. Cl.
CPC .......... *H04L 45/34* (2013.01); *H04L 12/4633* (2013.01); *H04L 45/50* (2013.01);
(Continued)

(58) Field of Classification Search
CPC ..... H04L 45/34; H04L 12/4633; H04L 45/50; H04L 45/741; H04L 45/745;
(Continued)

(56) References Cited

U.S. PATENT DOCUMENTS 9,929,946 B2 3/2018 Filsfils et al.
2009/0110395 A1* 4/2009 Lee .................. H04J 14/0246
398/48

FOREIGN PATENT DOCUMENTS

CN 104718730 A 6/2015
WO WO 2014144216 A1 9/2014

OTHER PUBLICATIONS

European Patent Office, EP19740894.1 Extended European Search Report dated Aug. 25, 2021.
Mirsky, et al., "Bidirectional Forwarding Detection (BFD) in Segment Routing Networks Using MPLS Dataplane; draft-mirsky-spring-bfd-03", issued on Dec. 4, 2017, Standardworkingdraft, ISOC.
(Continued)

*Primary Examiner* — Peter G Solinsky
(74) *Attorney, Agent, or Firm* — Li & Cai Intellectual Property (USA) Office

(57) ABSTRACT

The present disclosure discloses a method, device and storage medium for creating a bi-directional segment routing (SR) tunnel, the method includes: carrying out capability negotiation for whether to support creation of a bi-directional SR tunnel by messaging during a process in which a first network element establishes a session with a second network element; and if support, sending, by the first network element, an SR tunnel create message carrying a bi-directional flag bit to the second network element so that the second network element is capable of determining, in accordance with the bi-directional flag bit, whether a bi-directional tunnel or a unidirectional tunnel is to be created.

18 Claims, 4 Drawing Sheets

(51) Int. Cl.
*H04L 45/50* (2022.01)
*H04L 45/745* (2022.01)
*H04L 45/741* (2022.01)
*H04L 47/70* (2022.01)

(52) U.S. Cl.
CPC .......... *H04L 45/741* (2013.01); *H04L 45/745* (2013.01); *H04L 47/825* (2013.01)

(58) Field of Classification Search
CPC ... H04L 47/825; H04L 45/68; H04L 12/2859; H04L 12/4641; H04L 29/06068; H04L 29/06551
USPC ........................................................ 370/235
See application file for complete search history.

(56) References Cited

OTHER PUBLICATIONS

Wang, et al., "Path Segment in MPLS Based Sement Routing Network; draft-cheng-spring-mpls-path-segment-00" issued on Oct. 30, 2017, Standardworkingdraft, ISOC.
Chen, et al., "PCEP Extension for Segment Routing (SR) Bi-directional Associated Paths; draft-li-pce-sr-bidir-path-00" issued on Jun. 21, 2018, Standardworkingdraft, ISOC.
WIPO, International Search Report dated Mar. 14, 2019.
Huawei et al. "Path Segment in MPLS Based Sement Routing Network, draft-cheng-spring-mpls-path-segment-00" IETF, Oct. 30, 2017.
Cisco Systems, Inc. et al. "PCEP Extensions for Segment Routing, draft-ietf-pce-segment-routing-09" IETF, Apr. 10, 2017.
Cisco Systems et al. "Path Computation Element (PCE) Communication Protocol (PCEP)" IETF, Mar. 31, 2009.

\* cited by examiner

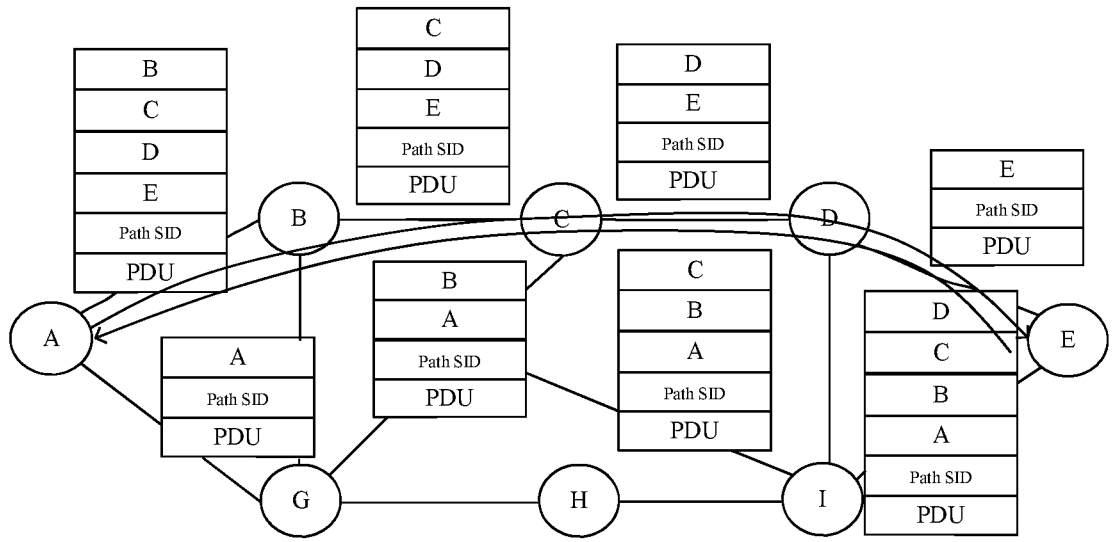

Fig. 1

```
                                                                         101
┌─────────────────────────────────────────────────────────────────────┐  /
│  Carry out capability negotiation for whether to support creation    │
│  of an SR tunnel by messaging during a process in which a first      │
│  network element establishes a session with a second network element │
└─────────────────────────────────────────────────────────────────────┘
                                    │
                                    ▼
                                                                         102
┌─────────────────────────────────────────────────────────────────────┐  /
│  If support, send, by the first network element, an SR tunnel create │
│  message carrying a bi-directional flag bit to the second network    │
│  element so that the second network element is capable of            │
│  determining, in accordance with the bi-directional flag bit,        │
│  whether a bi-directional tunnel or a unidirectional tunnel is to    │
│  be created                                                          │
└─────────────────────────────────────────────────────────────────────┘
```

Fig. 2

METHOD AND DEVICE FOR CREATING BI-DIRECTIONAL SEGMENT ROUTING TUNNEL AND STORAGE MEDIUM

CROSS-REFERENCE TO RELATED APPLICATION

The present application is based on and claims a priority from the Chinese patent application No. 201810050753.1 filed on Jan. 18, 2018, the entire disclosure of which is incorporated in the present application by reference.

TECHNICAL FIELD

The present disclosure relates to tunnel creation technologies, and particularly relates to a method and device for creating a bi-directional segment routing (SR) tunnel and storage medium.

BACKGROUND

As shown in FIG. 1, SR is a source routing technology that instructs packet forwarding by pressing a series of ordered labels (segments) into a source node. Through the designated path forwarding function of SR, complex network functions such as load balancing and traffic engineering of a network, and fast reroute protection that is not related to topology and the like can be implemented with great convenience. SR supports both multiprotocol label switching (MPLS) forwarding plane and IPv6 forwarding plane, is fully compatible with and inherits the existing MPLS forwarding data plane in the MPLS scenario, and can implement forwarding of a segment route without modifying a packet header of MPLS. Meanwhile, compared with the traditional MPLS scheme, SR has some unique advantages including that: different from the traditional MPLS network which implements label distribution, TE and other functions by means of a signaling protocol such as label distribution protocol (LDP), resource reservation protocol (RSVP) and the like, SR simplifies the control plane, is completely based on a distributed routing protocol, and implements label distribution by simply extending the existing interior gateway protocol (IGP). In the forwarding plane, labels represent information of network topology (nodes or links), while end-to-end connection is represented by a group of ordered label stacks, and the node needs to maintain only the topology information but not the connection status, thereby solving the problem of extensibility of the MPLS network. In addition, the source routing based technology completes establishment of an end-to-end path simply by operating a head node, which greatly improves the service deployment efficiency.

To implement traffic engineering in the SR network, a centralized controller or a Path Computation Element (PCE) often needs to be deployed to perform constrained path computation according to a bandwidth, cost, label resources, and the like of the entire network, so as to achieve global optimal traffic. PCE Communication Protocol (PCEP) is a path computation protocol widely applied to the existing networks, and may also be used as a southbound interface of an SR controller. In order to support the SR tunnel, PCEP is extended by IETF, and the specific content of the extension is described in an IETF workgroup draft draft-ietf-pce-segment-routing. When a PCEP session is initialized, a Path Computation Client (PCC) terminal and a PCE terminal are defined to perform capability negotiation on PCC and PCE through an OPEN message. If the negotiation is successful, an SR tunnel can be created through PCEP to support the deployment requirements of the SR in a controller scenario. However, the IETF draft can only create a common unidirectional SR tunnel, but does not support the bi-directional SR tunnel applied to a delivery network, leading to difficulties with deployment of the bi-directional SR tunnel.

SUMMARY

In an embodiment of the present disclosure, there is provided a method and device for creating a bi-directional SR tunnel and storage medium.

According to an embodiment of the present disclosure, there is provided a method for creating a bi-directional SR tunnel, including: carrying out capability negotiation for whether to support creation of an SR tunnel by messaging during a process in which a first network element establishes a session with a second network element; and if the creation of the SR tunnel is supported, sending, by the first network element, an SR tunnel create message carrying a bi-directional flag bit to the second network element to enable the second network element to determine, in accordance with the bi-directional flag bit, whether a bi-directional tunnel or a unidirectional tunnel is to be created.

According to an embodiment of the present disclosure, there is provided a method for creating a bi-directional SR tunnel, including: carrying out capability negotiation for whether to support creation of an SR tunnel by messaging during a process in which a second network element establishes a session with a first network element; if the creation of the SR tunnel is supported, receiving, by the second network element, an SR tunnel create message carrying a bi-directional flag bit sent from the first network element; and determining, by the second network element in accordance with the bi-directional flag bit, whether a bi-directional tunnel or a unidirectional tunnel is to be created.

According to an embodiment of the present disclosure, there is provided a device for creating a bi-directional SR tunnel, including: a first negotiation unit configured to carry out capability negotiation for whether to support creation of an SR tunnel by messaging during a process of establishing a session; and a sending unit configured to send, if the creation of the SR tunnel is supported, an SR tunnel create message carrying a bi-directional flag bit to a second network element to enable the second network element to determine, in accordance with the bi-directional flag bit, whether a bi-directional tunnel or a unidirectional tunnel is to be created.

According to an embodiment of the present disclosure, there is provided a device for creating a bi-directional SR tunnel, including: a second negotiation unit configured to carry out capability negotiation for whether to support creation of an SR tunnel by messaging during a process of establishing a session; and a receiving unit configured to receive, if the creation of the SR tunnel is supported, an SR tunnel create message carrying a bi-directional flag bit from a first network element; and determine, in accordance with the bi-directional flag bit, whether a bi-directional tunnel or a unidirectional tunnel is to be created.

According to an embodiment of the present disclosure, there is provided a device for creating a bi-directional SR tunnel, including: a processor, and a memory storing a computer program executable on the processor, where the processor is configured to, when executing the computer program, perform the method according any one of the above solutions.

According to an embodiment of the present disclosure, there is provided a storage medium storing a computer executable instruction thereon, where the computer executable instruction cause, when executed by a processor, the processor to perform the method according any one of the above solutions.

In the embodiments of the present disclosure, capability negotiation for whether to support creation of an SR tunnel is carried out by messaging during a process in which a first network element establishes a session with a second network element; and if the creation of the SR tunnel is supported, the first network element sends an SR tunnel create message carrying a bi-directional flag bit to the second network element to enable the second network element to determine, in accordance with the bi-directional flag bit, whether a bi-directional tunnel or a unidirectional tunnel is to be created.

When adopting the embodiments of the present disclosure, since it can be known by messaging whether the creation of the SR tunnel is supported, and the first network element delivers the SR tunnel create message containing the bi-directional flag bit, the second network element may determine, in accordance with the bi-directional flag bit, whether a bi-directional tunnel or a unidirectional tunnel is to be created, which simplifies deployment of the bi-directional SR tunnel.

BRIEF DESCRIPTION OF THE DRAWINGS

In the drawings, which are not necessarily drawn to scale, like reference numerals may describe similar components in different views. Like reference numerals having different letter suffixes may represent different examples of similar components. In the drawings, FIG. 1 is a schematic diagram of a bi-directional SR tunnel model in the related art;

FIG. 2 is a schematic flowchart of a method according to an embodiment of the present disclosure;

DETAILED DESCRIPTION

Figure 3:
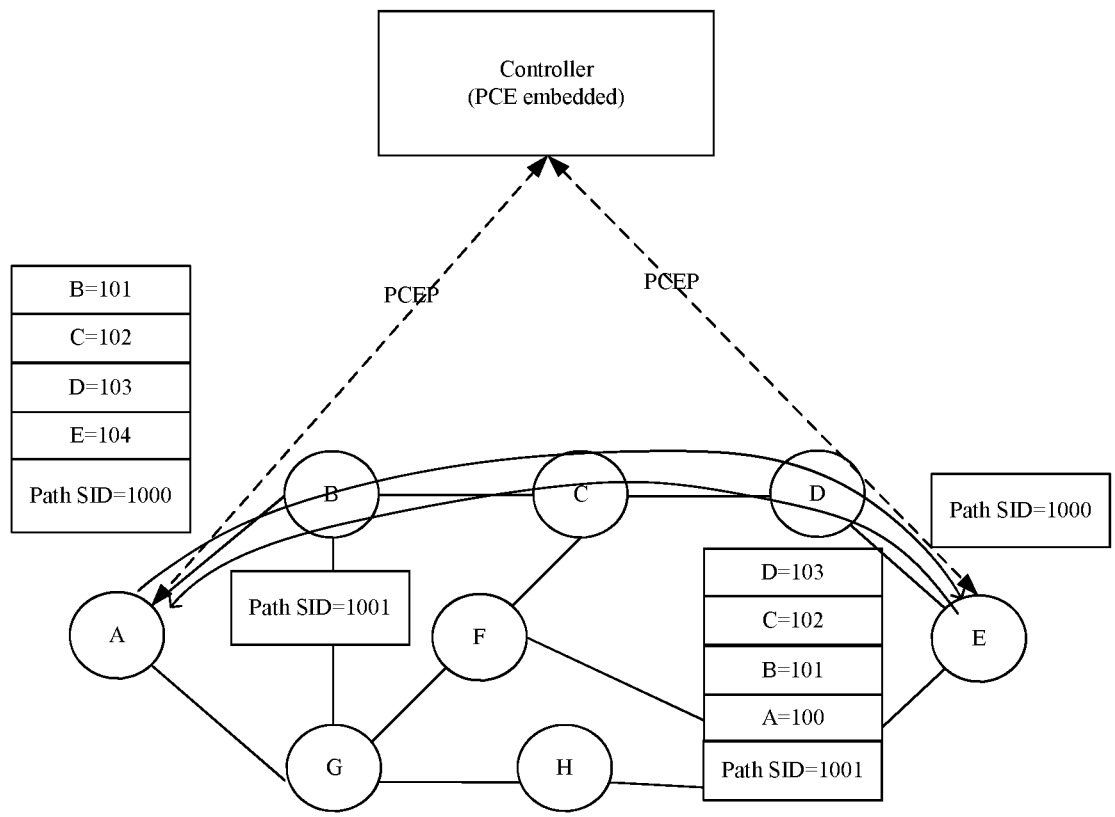
FIG. 3 is a schematic diagram of a bi-directional SR tunnel model created by PCEP according to an embodiment of the present disclosure.

According to an embodiment of the present disclosure, there is provided a method for creating a bi-directional SR tunnel, which, as shown in FIG. 2, includes the following steps 101 to 102.

At step 101, capability negotiation for whether to support creation of an SR tunnel is carried out by messaging during a process in which a first network element establishes a session with a second network element.

At step 102, if the creation of the SR tunnel is supported, the first network element sends an SR tunnel create message carrying a bi-directional flag bit to the second network element to enabled the second network element to determine, in accordance with the bi-directional flag bit, whether a bi-directional tunnel or a unidirectional tunnel is to be created.

In practical applications, the first network element may be a PCE, and the second network element may be a PCC. In the embodiment of the present disclosure, PCEP is extended to realize the creation of the SR tunnel. Specifically, by extending PCEP, the device and the controller may notify and negotiate whether to support the SR path function and the bi-directional SR tunnel function, and, if the device supports, PCEP may carry path identification information in the SR tunnel to complete the creation of the bi-directional SR tunnel. The embodiments of the present disclosure relate to a solution of supporting SR path information and creation of a bi-directional SR tunnel by extending PCEP, and involve a forwarding device (such as PCC) and a related controller (such as PCE) running SR. Specifically, capability negotiation for whether to support creation of a bi-directional SR tunnel is carried out by messaging during a process in which PCE establishes a session with PCC so that the device and the controller may notify and negotiate whether to support the bi-directional SR tunnel function. PCE sends an SR tunnel create message carrying a bi-directional flag bit to PCC to enable PCC to determine, in accordance with the flag bit, whether a bi-directional tunnel or a unidirectional tunnel is to be created, and so that if the device supports, PCEP may carry path identification information in the SR tunnel to complete the creation of the bi-directional SR tunnel.

In view of the conventional SR technology, there are two main problems as follows:

1. Stateless intermediate node. SR is a source routing technology in which a connected state exists only in a head node, while an intermediate node cannot sense the service, and thus cannot support extended functions of the service, such as traffic statistics on the SR service at the intermediate node. To this end, an IETF draft draft-hegde-spring-traffic-accounting-for-sr-paths defines a representation method for SR paths, in which two or three layers of labels are used to represent the SR path information, and the SR path information is inserted into an SR label stack to be forwarded with a data packet. In this way, the intermediate node can uniquely determine a piece of end-to-end connection according to the SR path information, and perform other applications such as traffic statistics according to the SR path information.

2. SR not supporting bi-directional tunnel. Conventional MPLS may form a bi-directional tunnel by associating unidirectional tunnels. However, like the above problem, the SR tunnel maintains the connected state only at a head node, while a tail node does not carry any connection information. Therefore, association and binding between two unidirectional tunnels cannot be implemented at both ends, resulting in a limitation on applications of SR. Similarly, an IETF draft draft-cheng-spring-mpls-path-segment extends SR for the application in a delivery network, and defines a Segment Routing Transport Profile (SR-TP) tunnel for the delivery network. A Path SID is introduced to identify an SR path and implement bi-directional binding, as shown in FIG. 1. The Path SID, as an SR path identifier, is placed after the last SR Segment, and nodes at both ends of the SR path need to maintain a mapping relationship between the SR path information and the Path SID, so as to implement the binding of the bi-directional tunnel.

By introducing the SR path information, the embodiments of the present disclosure solve the problem that the intermediate node is not aware of state as well as the problem of bi-directional tunnel binding, thereby greatly expanding the application scenarios of SR. SR deployment in a controller scenario also requires PCEP to support the function of extending the SR path, but current PCEP can only create a conventional SR tunnel without carrying SR path information and cannot support creation of a bi-directional SR tunnel, leading to difficulties with deployment the bi-directional SR tunnel. Therefore, by extending PCEP, the embodiments of the present disclosure enable the device and the controller to notify and negotiate whether to support the SR path function and the bi-directional SR tunnel function. If the device supports, PCEP can carry path identification information in the SR tunnel to complete the creation of the bi-directional SR tunnel. Thus, the problem that PCEP defined by the IETF draft draft-IETF-pce-segment-routing can only establish a common unidirectional SR tunnel, and the problem that a bi-directional SR tunnel is difficult to deploy are solved. As a result, SR path information can be carried in the unidirectional tunnel, creation of a bi-directional SR tunnel is supported, and application scenarios of PCEP in the SR network are expanded.

For the bi-directional SR tunnel in the embodiments of the present disclosure, it differs from the conventional unidirectional SR tunnel mainly in that: First, the unidirectional SR can complete tunnel deployment by delivering a label stack to only the head node, while the bi-directional SR tunnel requires configuration to be delivered to both end nodes, as shown in FIG. 3; and Second, Path SID for identifying end-to-end connection is carried in the bi-directional SR label stack, and the Path SID has a different meaning from Node SID and Adj SID in the conventional SR technology. The conventional Node SID and Adj SID are delivered only to a head node of the service path, and have no directionality. In contrast, Path SID is used to identify a piece of end-to-end connection at the head node and the tail node, is thus required to be delivered to both the head node and the tail node and has directionality, i.e., there may be either forward path information or reverse path information. The embodiments of the present disclosure extend PCEP in view of the above two points to support creation of a bi-directional SR tunnel, and specifically include the following contents.

Capability negotiation for whether to support delivery of SR path information and creation of a bi-directional SR tunnel is carried out by messaging during a process in which PCE establishes a session with PCC. PCE sends an SR tunnel create message carrying a bi-directional flag bit to PCC so that PCC can determine, in accordance with the flag bit, whether a bi-directional tunnel or a unidirectional tunnel is to be created.

The label stack carried in the unidirectional SR tunnel create message delivered to PCC from PCE may include forward SR path information, or may not include any SR path information.

The label stack carried in the bi-directional SR tunnel create message delivered to PCC from PCE is required to have SR path information, and to carry both forward and reverse path information at the same time.

According to the received tunnel create message carrying the bi-directional tunnel flag bit, PCC extracts the forward and reverse path information carried in the message and generates a corresponding forwarding table.

Upon receiving the corresponding forwarding packet, each of the nodes encapsulates and forwards the corresponding packet according to the forwarding table.

In an embodiment of the present disclosure, the SR tunnel create message carries the label stack composed of at least one label; and the label stack does not contain any SR path information, or contains SR path information in any direction.

In an embodiment of the present disclosure, when the label is Node SID, an existing protocol standard is adopted, which is different from a Path SID in that no SR path information is contained.

In an embodiment of the present disclosure, when the label is Adj SID, an existing protocol standard is adopted, which is different from a Path SID in that no SR path information is contained.

In an embodiment of the present disclosure, when the label is Path SID, SR path information in any direction is contained, and the SR path information in any direction includes forward path information and/or reverse path information. In practical applications, it is specifically forward path SID and reverse path SID.

According to an embodiment of the present disclosure, there is provided a method for creating a bi-directional SR tunnel, including: carrying out capability negotiation for whether to support creation of a bi-directional SR tunnel by messaging during a process in which a second network element establishes a session with a first network element; if the creation of the SR tunnel is supported, receiving, by the second network element, an SR tunnel create message carrying a bi-directional flag bit sent from the first network element; and determining, by the second network element in accordance with the bi-directional flag bit, whether a bi-directional tunnel or a unidirectional tunnel is to be created.

Specifically, when the first network element is PCE and the second network element is PCC, capability negotiation for whether to support creation of a bi-directional SR tunnel is carried out by messaging during a process in which PCE establishes a session with PCC; if the creation of the SR tunnel is supported, PCC receives an SR tunnel create message carrying a bi-directional flag bit from PCE; and PCC determines, in accordance with the bi-directional flag bit, whether a bi-directional tunnel or a unidirectional tunnel is to be created.

In an embodiment of the present disclosure, the SR tunnel create message carries a label stack composed of at least one label; and the label stack does not contain any SR path information, or contains SR path information in any direction.

In an embodiment of the present disclosure, when the label is Node SID, an existing protocol standard is adopted, which is different from a Path SID in that no SR path information is contained.

In an embodiment of the present disclosure, when the label is Adj SID, an existing protocol standard is adopted, which is different from a Path SID in that no SR path information is contained.

In an embodiment of the present disclosure, when the label is Path SID, SR path information in any direction is contained, and the SR path information in any direction includes forward path information and/or reverse path information.

In an embodiment of the present disclosure, the method may further include: completing, by the second network element, association and binding of the bi-directional path according to the forward path information and/or the reverse path information carried in the SR tunnel create message, and generating a corresponding forwarding table. Specifically, PCC completes association and binding of the bi-directional path according to the forward path information and/or the reverse path information carried in the SR tunnel create message, and generates a corresponding forwarding table.

According to an embodiment of the present disclosure, there is provided a device for creating a bi-directional SR tunnel, which may be a first network element such as PCE, and includes: a first negotiation unit configured to carry out capability negotiation for whether to support creation of an SR tunnel by messaging during a process of establishing a session; and a sending unit configured to send, if the creation of the SR tunnel is supported, an SR tunnel create message carrying a bi-directional flag bit to a second network element to enable the second network element to determine, in accordance with the bi-directional flag bit, whether a bi-directional tunnel or a unidirectional tunnel is to be created.

In an embodiment of the present disclosure, the SR tunnel create message carries a label stack composed of at least one label; and the label stack does not contain any SR path information, or contains SR path information in any direction.

In an embodiment of the present disclosure, when the label is Node SID, an existing protocol standard is adopted, which is different from a Path SID in that no SR path information is contained.

In an embodiment of the present disclosure, when the label is Adj SID, an existing protocol standard is adopted, which is different from a Path SID in that no SR path information is contained.

In an embodiment of the present disclosure, when the label is Path SID, SR path information in any direction is contained, and the SR path information in any direction includes forward path information and/or reverse path information.

According to an embodiment of the present disclosure, there is provided a device for creating a bi-directional SR tunnel, which may be a second network element such as PCC, and includes: a second negotiation unit configured to carry out capability negotiation for whether to support creation of an SR tunnel by messaging during a process of establishing a session; and a receiving unit configured to receive, if the creation of the SR tunnel is supported, an SR tunnel create message carrying a bi-directional flag bit from a first network element; and determine, in accordance with the bi-directional flag bit, whether a bi-directional tunnel or a unidirectional tunnel is to be created.

In an embodiment of the present disclosure, the SR tunnel create message carries a label stack composed of at least one label; and the label stack does not contain any SR path information, or contains SR path information in any direction.

In an embodiment of the present disclosure, when the label is Node SID, an existing protocol standard is adopted, which is different from a Path SID in that no SR path information is contained.

In an embodiment of the present disclosure, when the label is Adj SID, an existing protocol standard is adopted, which is different from a Path SID in that no SR path information is contained.

In an embodiment of the present disclosure, when the label is a path label Path SID, the label contains SR path information in any direction, and the SR path information in any direction includes forward path information and/or reverse path information.

In an embodiment of the present disclosure, the device may further include: a table generating unit configured to complete association and binding of the bi-directional path according to the forward path information and/or the reverse path information carried in the SR tunnel create message, and generate a corresponding forwarding table.

According to an embodiment of the present disclosure, there is provided a storage medium storing a computer executable instruction thereon, the computer executable instruction cause, when executed by a processor, the processor to perform the method of creating a bi-directional SR tunnel according to any one of the above embodiments.

In order to more detailly describe several main handling processes involved in the method and system of the present disclosure, the following description is made through application embodiments.

Figure 4:
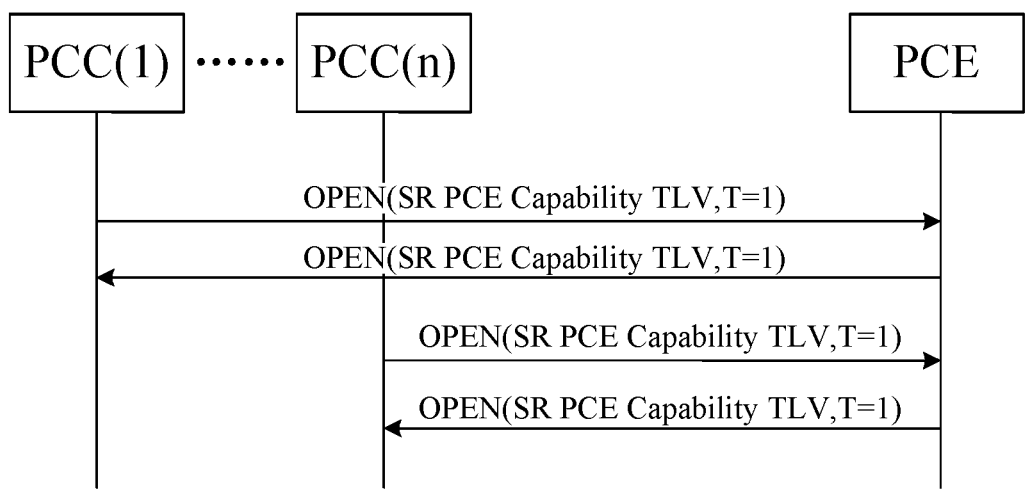
FIG. 4 is a schematic diagram illustrating capability negotiation via an OPEN message according to an embodiment of the present disclosure.

First Application Embodiment: Carrying Indication Mark for Supporting Bi-Directional SR Tunnel in OPEN Message As shown in FIG. 4, PCC(1) to PCC(n) are N PCC nodes in a network, and PCE is a separately deployed entity or a controller embedded module. By adopting the method in the embodiment of the disclosure, an indication mark indicating whether a default LSP status report on each PCC is reported may be set at an initialization stage. This embodiment performs extension based on a flag in SR PCE Capability TLV in the OPEN message, thereby implementing the indication mark indicating whether the LSP status report on the PCC is reported. The specific process includes:

1) PCE sends an OPEN message to PCC(1) to PCC(n), and the OPEN message carries SR PCE Capability TLV. The extension of this TLV is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type = TBD            |          Length = 4           |
+-+-+-+-+-+-+-+-+-+-+-+-+-+-+-+-+-+-+-+-+-+-+-+-+-+-+-+-+-+-+-+-+
|          Reserved             |    Flags  |T|L|      MSD      |
+-+-+-+-+-+-+-+-+-+-+-+-+-+-+-+-+-+-+-+-+-+-+-+-+-+-+-+-+-+-+-+-+
``` where Flags field may be used for self-extension. Current standards define only an L bit (the highest bit), while this embodiment extends to define a T bit therein. The T bit (SR-TP Flag) is 1 bit used for declaring whether SR-TP capability is supported.

If T=1 in SR PCE Capability TLV carried in the OPEN message issued by PCC, it means that PCC supports SR-TP functions, including identification and extraction of SR path information, bi-directional tunnel binding, identification of forward and reverse labels, etc.

If T=1 in SR PCE Capability TLV carried in the OPEN message issued by PCE, it means that PCE supports SR-TP functions, i.e., supports computation of bi-directional SR paths, allocation of SR path labels, and generation of forward SR path information for the head node and reverse SR path information for the tail node.

2) Both PCE and PCC need to check SR PCE Capability TLV in the received OPEN message, and further confirm that T bit is included. The negotiation result allows creation of a bi-directional SR tunnel between PCE and PCC only when both of them support T=1; otherwise, only a unidirectional SR tunnel can be created.

Figure 5:
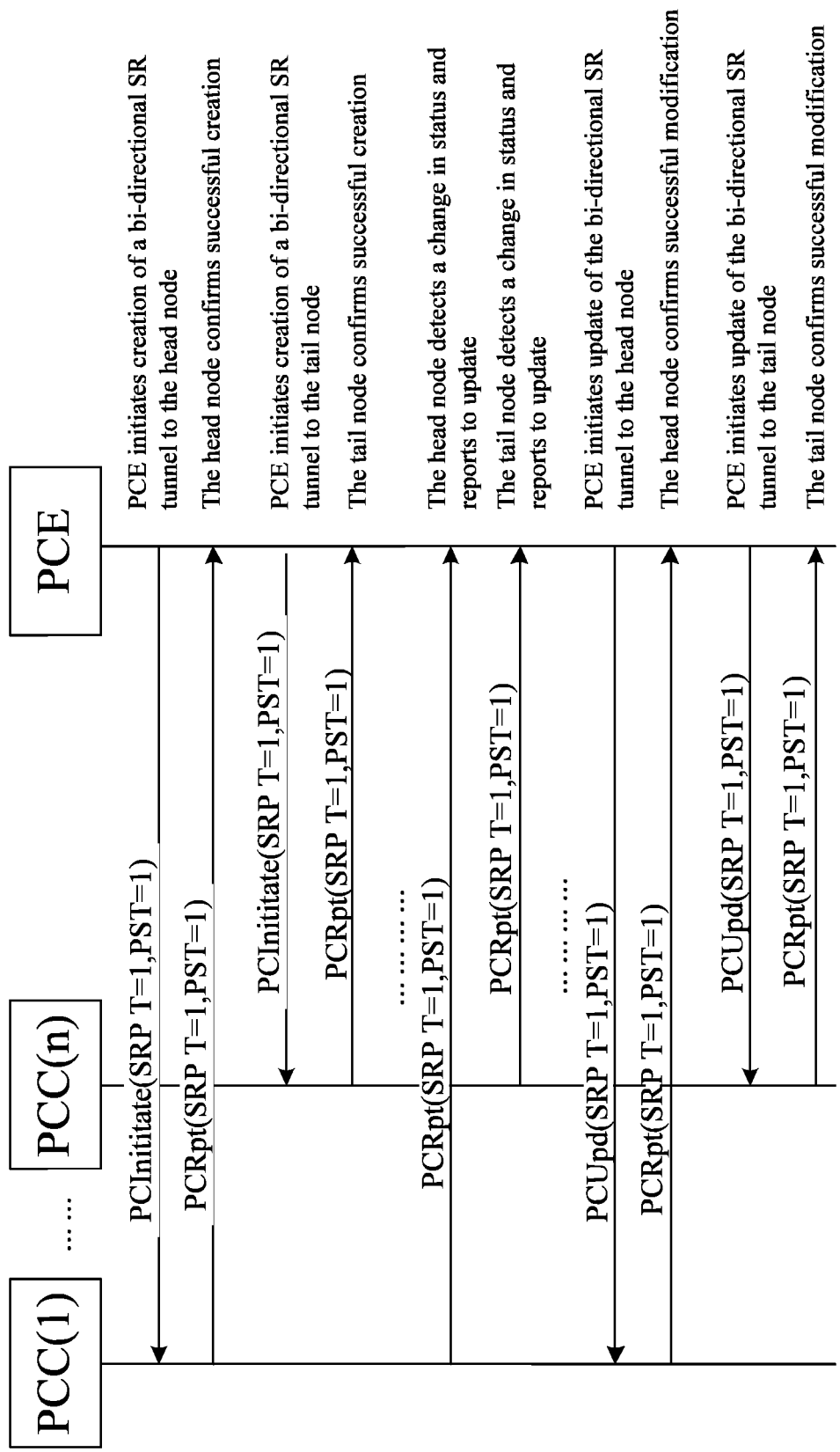
FIG. 5 is a schematic diagram illustrating creation, reporting and modification processes of a bi-directional SR tunnel according to an embodiment of the present disclosure.

Second Application Embodiment: Initiating Creation and Modification of Bi-Directional SR Tunnel by PCE As shown in FIG. 5, PCC(1) to PCC(n) are N PCC nodes in a network, and PCE is a separately deployed entity or a controller embedded module. When a controller or an upper layer application program needs to create a bi-directional SR tunnel, by adopting the method in the embodiment of the disclosure, PCE may initiate creation of a bi-directional SR tunnel through an extended PCEP message. In this embodiment, PCC(1) is a head node (endpoint A) of the bi-directional SR tunnel, and PCC(n) is a tail node (endpoint Z) of the SR tunnel. The specific process includes:

1) PCE initiates tunnel creation through a PCInitiate message, and the message is required to carry Stateful Request Parameters (SRP) and Explicit Route Object (ERO). SRP is used to describe basic information of the PCInitiate message, such as a serial number of the message, whether the message is used for creating a tunnel or deleting a tunnel, and the like. ERO carries detailed path parameters of the tunnel.

2) To initiate the creation of the bi-directional SR tunnel, PCE needs to extend in the SRP object that describes basic information of the message:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                     Flags                                |B|R|
+-+-+-+-+-+-+-+-+-+-+-+-+-+-+-+-+-+-+-+-+-+-+-+-+-+-+-+-+-+-+-+-+
|                       SRP-ID-number                          |
+-+-+-+-+-+-+-+-+-+-+-+-+-+-+-+-+-+-+-+-+-+-+-+-+-+-+-+-+-+-+-+-+
|                                                              |
//                       Optional TLVs                        //
|                                                              |
+-+-+-+-+-+-+-+-+-+-+-+-+-+-+-+-+-+-+-+-+-+-+-+-+-+-+-+-+-+-+-+-+
``` where the Flags field is 32 bits in total and can be extended by itself. Current standards define only an R bit (the highest bit), while this embodiment extends to define a B bit therein. The B bit (Bi-direction) is 1 bit used to indicate that the PCE instructs PCC to create a bi-directional tunnel. Optional TLV in SRP may be extended to carry a Path Setup Type TLV field to indicate a type of the tunnel to be created, where Path Setup Type (PST)=1 represents an SR tunnel, and PST=0 represents an RVPE-TE tunnel. Therefore, parameters of the specific tunnel to be created become explicit by a combination of the extended B bit and PST:

When B=1 and PST=1, it means that a bi-directional SR tunnel is created.

When B=0 and PST=1, it means that a unidirectional SR tunnel is created.

When B=1 and PST=0, it means that a bi-directional RSVP-TE tunnel is created.

When B=0 and PST=0, it means that a unidirectional RSVP-TE tunnel is created.

Therefore, the extended B bit may be used to indicate creation of either an SR tunnel or a common RSVP-TE tunnel. In this embodiment, the B bit in the SRP object is set to 1, and PST=1.

3) After receiving the PCInitiate message from step 2), PCC starts to parse the packet content, and creates a tunnel according to ERO path information carried in the message. According to the description in the draft-ietf-pce-segment-routing draft, the ERO information of the SR tunnel is composed of a series of SR-ERO sub-objects, each SR-ERO representing one piece of segment information.

4) The SR-ERO sub-objects can represent only Node SID and Adj SID, but not SR path information. A new SR-Path-ERO sub-object is extended and defined to describe SR path information. SR-Path-ERO constitutes the complete ERO together with an SR-ERO list, and SR-Path-ERO may appear at any position in the SR-ERO list. The SR-Path-ERO sub-object has, expressed in TLV, a format as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |  PT  |     Flags         |D|
+-+-+-+-+-+-+-+-+-+-+-+-+-+-+-+-+-+-+-+-+-+-+-+-+-+-+-+-+-+-+-+-+
//                    Path Status (variable)                  //
+-+-+-+-+-+-+-+-+-+-+-+-+-+-+-+-+-+-+-+-+-+-+-+-+-+-+-+-+-+-+-+-+
                      SR-Path-ERO sub-object
```

Type indicates the SR-Path-ERO sub-object, and the specific value is to be allocated.

Length identifies a length of the sub-object, which is not necessarily dependent on a type of the carried SR Path Status.

PT (Path type) is 4 bit used to identify the type of the SR path status, which currently includes two types, i.e., a manner represented by two or three layers of labels defined by draft-hegde-spring-traffic-accounting-for-sr-paths, and a manner represented by one layer of label defined by draft-cheng-spring-mpls-path-segment. Detailed information thereof is carried in the Path Status field.

The Flags field is 12 bits in total and is self-extendable. Currently, only a D (Direction Flag: 1 bit) bit is defined for identifying a direction of SR path Status. D=0 indicates a forward direction, i.e., a sending direction, and D=1 indicates a reverse direction, i.e., a receiving direction. It should be noted that only when a bi-directional tunnel is created, SR-Path-ERO is allowed to carry reverse SR Path Status, while SR-Path-ERO of the unidirectional tunnel may carry only forward SR Path Status; otherwise, an error prompt is returned.

PT=0 indicates that Path Status includes one layer of labels, and the format of Path Status is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Path Label              | TC |S|       TTL        |
+-+-+-+-+-+-+-+-+-+-+-+-+-+-+-+-+-+-+-+-+-+-+-+-+-+-+-+-+-+-+-+-+
```

PT=1 indicates that Path Status includes two layers of labels, and the format of Path Status is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         SR-Path-Indicator         | TC |S|       TTL        |
+-+-+-+-+-+-+-+-+-+-+-+-+-+-+-+-+-+-+-+-+-+-+-+-+-+-+-+-+-+-+-+-+
|C|      SR-Path-Indentifier        | TC |S|       TTL        |
+-+-+-+-+-+-+-+-+-+-+-+-+-+-+-+-+-+-+-+-+-+-+-+-+-+-+-+-+-+-+-+-+
```

Taking the bi-directional SR path shown in FIG. 3 as an example for illustration, PCE of the controller computes that the bi-directional SR tunnel between A and E needs to pass through five nodes, A-B-C-D-E, and a unique Path SID is allocated to the SR tunnel, so that the SR segment and the Path SID are combined into a complete label stack to be delivered to the head node and the tail node. For the head node A, the delivered forward label stack is {101, 102, 103, 104, 1000}, while the reverse label stack is {1001}; and for the tail node E, the delivered forward label stack is {103, 102, 101, 100, 1001}, while the reverse label stack is {1000}. Therefore, the PCEP ERO information delivered to the node A from PCE is as follows, and the complete ERO includes 6 sub-objects:

a first sub-object SR-ERO, SID=101;
a second sub-object SR-ERO, SID=102;
a third sub-object SR-ERO, SID=103;
a fourth sub-object SR-ERO, SID=104;
a fifth sub-object SR-Path-ERO, PT=0, D=0, SID=1000; and
a sixth sub-object SR-Path-ERO, PT=0, D=1, SID=1001.

The PCEP ERO information delivered to the node E from PCE is as follows, also including 6 sub-objects:

a first sub-object SR-ERO, SID=103;
a second sub-object SR-ERO, SID=102;
a third sub-object SR-ERO, SID=101;
a fourth sub-object SR-ERO, SID=100;
a fifth sub-object SR-Path-ERO, PT=0, D=0, SID=1001; and
a sixth sub-object SR-Path-ERO, PT=0, D=1, SID=1000.

5) According to the received SR-ERO and SR-Path-ERO, PCC parses the SR label information and the SR path information, and generates a forwarding table. Thus, the creation of the bi-directional SR tunnel is completed.

6) After the creation is finished, PCC returns a PCRpt message to PCE to confirm that the tunnel is created successfully. PCRpt also needs to carry an SRP object that represents basic contents of the message, where extended bits are also needed to indicate that the message is an acknowledgement message of a bi-directional tunnel.

7) Upon detecting a status change, PCC reports the real-time status to PCE via the PCRpt message, where the PCRpt message needs to carry status information of the tunnel and current tunnel path information. The path information is carried in a Reported Route Object (RRO) which, like ERO, is also composed of a series of SR-RRO sub-objects, each SR-RRO representing one piece of segment information.

8) Besides creating the bi-directional SR tunnel, PCE may also actively modify the bi-directional SR tunnel, such as parameters of the SR path, a bandwidth, attributes, and the like, through a PCUpd message. Like the PCInitiate message, the PCUpd message is also required to carry SRP and ERO objects. Therefore, the extension for the SRP object and the extension for the SR-Path-ERO sub-object described in the above steps 2) and 4) are also applicable to the PCUpd message.

9) According to the SR-ERO carried in the received PCUpd message, PCC parses the specific label value and direction, and generates a forwarding table. Thus, modification of the bi-directional SR tunnel is completed.

10) After the modification is finished, PCC returns a PCRpt message to PCE to confirm that the tunnel is created successfully.

Third Application Embodiment: Initiating Deletion of Bi-Directional SR Tunnel by PCE As shown in FIG. 5, PCC(1) to PCC(n) are N PCC nodes in a network, and PCE is a separately deployed entity or a controller embedded module. When a controller or an upper layer application program needs to delete a bi-directional SR tunnel, by adopting the method in the embodiment of the disclosure, PCE may initiate deletion of a bi-directional SR tunnel through an extended PCEP message. In this embodiment, PCC(1) is a head node (endpoint A) of the bi-directional SR tunnel, and PCC(n) is a tail node (endpoint Z) of the SR tunnel. The specific process includes:

1) PCE initiates tunnel deletion through a PCInitiate message, and the message is required to carry Stateful Request Parameters (SRP) and an LSP object. SRP is used to describe basic information of the PCInitiate message, such as a serial number of the message, whether the message is used for creating a tunnel or deleting a tunnel, and the like. The LSP object carries an ID of the tunnel to be deleted. The ERO object does not need to be carried in the delete message.

2) Like the creation of the bi-directional tunnel, the delete message of the bi-directional SR tunnel also needs to use the extension flag B bit:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                         Flags                         |B|R|
+-+-+-+-+-+-+-+-+-+-+-+-+-+-+-+-+-+-+-+-+-+-+-+-+-+-+-+-+-+-+-+-+
|                       SRP-ID-number                           |
+-+-+-+-+-+-+-+-+-+-+-+-+-+-+-+-+-+-+-+-+-+-+-+-+-+-+-+-+-+-+-+-+
|                                                               |
//                       Optional TLVs                         //
|                                                               |
+-+-+-+-+-+-+-+-+-+-+-+-+-+-+-+-+-+-+-+-+-+-+-+-+-+-+-+-+-+-+-+-+
```

The R bit of SRP indicates whether the message is create or delete. In this embodiment, the B bit in the SRP object is set to 1, and the R bit is set to 1.

3) After receiving the PCInitiate message from step 2), PCC starts to parse the packet content, and finds the tunnel to be deleted according to the LSP information carried in the message, so as to complete deletion of the bi-directional tunnel.

4) After the deletion is finished, PCC returns a PCRpt message to PCE to confirm that the tunnel is deleted successfully.

Figure 6:
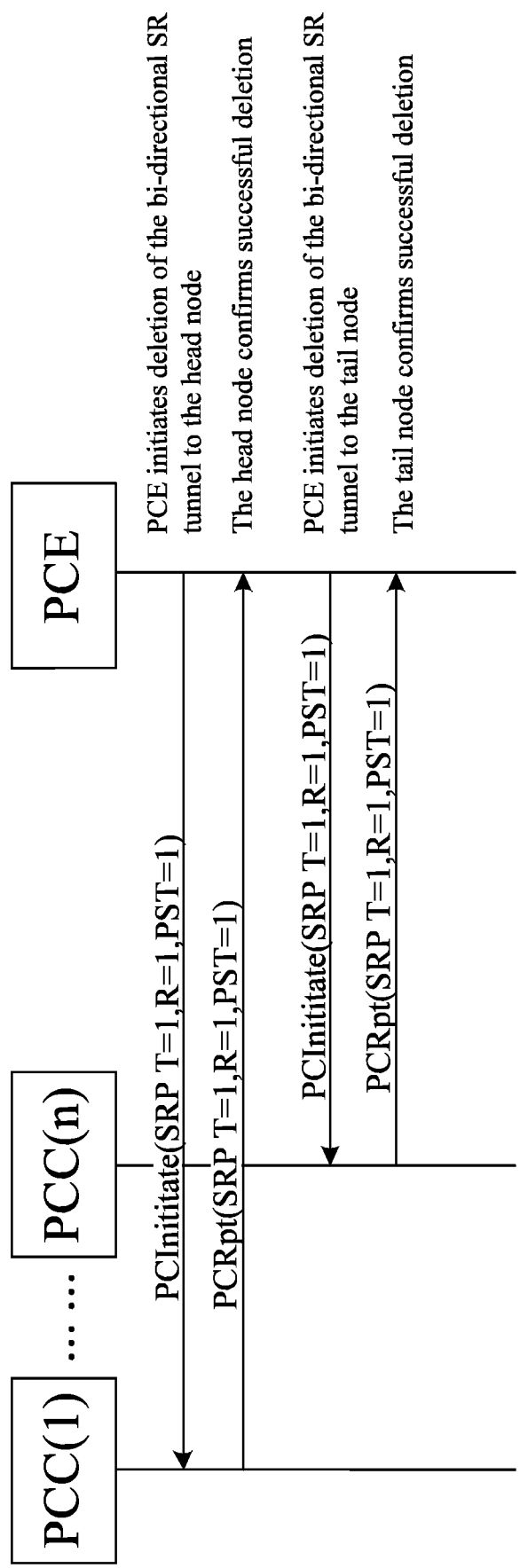
FIG. 6 is a schematic diagram illustrating deletion process of a bi-directional SR tunnel according to an embodiment of the present disclosure.

Fourth Application Embodiment: Initiating Creation of Unidirectional SR Tunnel with SR Path Information by PCE As shown in FIG. 6, PCC(1) to PCC(n) are N PCC nodes in a network, and PCE is a separately deployed entity or a controller embedded module. When a controller or an upper layer application program needs to create a unidirectional SR tunnel, by adopting the method in the embodiment of the disclosure, PCE may initiate creation of a unidirectional SR tunnel through an extended PCEP message. In this embodiment, PCC(1) is a head node (endpoint A) of the unidirectional SR tunnel, and PCC(n) is a tail node (endpoint Z) of the SR tunnel. The specific process includes:

1) PCE initiates tunnel creation through a PCInitiate message, and the message is required to carry Stateful Request Parameters (SRP) and Explicit Route Object (ERO). SRP is used to describe basic information of the PCInitiate message, such as a serial number of the message, whether the message is used for creating a tunnel or deleting a tunnel, and the like. ERO carries detailed path parameters of the tunnel.

2) To initiate creation of a unidirectional SR tunnel with SR path information by PCE, the ERP information is required to carry SR-Path-ERO sub-objects. As illustrated in the example of FIG. 3, PCE of the controller computes that the unidirectional SR tunnel between A and E needs to pass through five nodes, A-B-C-D-E, and a unique piece of path information is allocated to the SR tunnel and inserted after labels of C and E. Since the position of the path information is uncertain, the two-layer label manner is adopted, where the first layer is SR-Path-Indicator, using reserved labels of 0 to 15, and the latter layer is a Path label. Then, the complete label stack is {101, 102, SR-Path-Indicator, 1000, 103, 104, SR-Path-Indicator, 1000}. Therefore, the PCEP ERO information delivered to the node A from PCE is as follows, and the complete ERO includes 6 sub-objects:

a first sub-object SR-ERO, SID=101;
a second sub-object SR-ERO, SID=102;
a third sub-object SR-Path-ERO, PT=1, D=0, SID=1000;
a fourth sub-object SR-ERO, SID=103;
a fifth sub-object SR-ERO, SID=104; and
a sixth sub-object SR-Path-ERO, PT=1, D=0, SID=1000.

3) According to the received SR-ERO and SR-Path-ERO, PCC parses the SR label information and the SR path information, and generates a forwarding table.

4) After the creation is finished, PCC returns a PCRpt message to PCE to confirm that the tunnel is created successfully.

Those skilled in the art will appreciate that embodiments of the present disclosure may be provided as a method, a system, or a computer program product. Accordingly, the present disclosure may take the form of a hardware embodiment, a software embodiment, or a combination embodiment of software and hardware. Moreover, the present disclosure may take the form of a computer program product embodied on one or more computer-usable storage media (including but not limited to disk storage and optical storage, etc.) including a computer-usable program code.

The present disclosure has been described with reference to flowcharts and/or block diagrams of the methods, apparatus (systems), and computer program products according to the embodiments of the present disclosure. It will be appreciated that each flow and/or block in the flowcharts and/or block diagrams, as well as any combination thereof, may be implemented by computer program instructions. These computer program instructions may be provided to a general purpose computer, a special purpose computer, an embedded processor, or a processor of other programmable data processing apparatus, such that the instructions, which execute via the processor of the computer or other programmable data processing apparatus, create means for implementing the functions specified in one or more flows of the flowchart and/or one or more blocks of the block diagram.

In view of this, in an embodiment of the present disclosure, there is further provided a device for creating a bi-directional SR tunnel, including: a processor, and a memory storing a computer program executable on the processor, where the processor is configured to, when executing the computer program, perform steps of any one of the above methods at the first network element side, or perform steps of any one of the above methods at the second network element side.

These computer program instructions may also be stored in a computer readable memory that can direct a computer or other programmable data processing apparatus to operate in a particular manner, such that the instructions stored in the computer readable memory produce an article of manufacture comprising an instruction means for implementing the functions specified in one or more flows of the flowchart and/or one or more blocks of the block diagram.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in one or more flows of the flowchart and/or one or more blocks of the block diagram.

The above are only preferred embodiments of the present disclosure and not intended to limit the scope of the present disclosure.

What is claimed is:

1. A method for creating a bi-directional segment routing (SR) tunnel, comprising:
    carrying out capability negotiation for whether to support creation of a bi-directional SR tunnel by messaging during a process in which a path computation element (PCE) establishes a session with a path computation client (PCC);
    in response to that the creation of the SR tunnel is supported, sending, by the PCE, an SR tunnel create message carrying a bi-directional flag bit to the PCC to enable the PCC to determine, in accordance with the bi-directional flag bit, whether a bi-directional tunnel or a unidirectional tunnel is to be created; and
    in a case where the PCC determine the bi-directional tunnel is to be created, allocating a unique path label Path SID to the bi-directional tunnel, combining SR segments of nodes included in the bi-directional tunnel and the Path SID into a label stack, and delivering the label stack to a head node and a tail node among the nodes.

2. The method according to claim 1, wherein the SR tunnel create message carries the label stack composed of at least one label; and
    the label stack does not contain any SR path information, or contains SR path information in any direction.

3. The method according to claim 2, wherein when the label is the path label Path SID, the label contains SR path information in any direction;
    wherein the SR path information in any direction comprises forward path information and/or reverse path information.

4. The method according to claim 3, wherein the PCC extracts the forward path information and the reverse path information carried in the SR tunnel create message carrying the bi-directional flag bit, generates a corresponding forwarding table, each of the nodes encapsulates and forwards a corresponding packet according to the forwarding table.

5. The method according to claim 1, the Path SID is different from a Node SID and an Adj SID which are delivered to a head node of a service path.

6. The method according to claim 1, further comprises:
    receiving, by the PCE, a real-time status from the PCC via a PCRpt message in which status information of the bi-directional tunnel and current tunnel path information are carried, upon detecting a status change by the PCC.

7. The method according to claim 1, further comprises:
    modifying, by the PCE, the bi-directional tunnel through a PCUpd message in which stateful request parameters and explicit route objects are carried.

8. A method for creating a bi-directional segment routing (SR) tunnel, comprising:
    carrying out capability negotiation for whether to support creation of a bi-directional SR tunnel by messaging during a process in which a path computation client (PCC) establishes a session with a path computation element (PCE);

in response to that the creation of the SR tunnel is supported, receiving, by the PCC, an SR tunnel create message carrying a bi-directional flag bit sent from the PCE;

determining, by the PCC, in accordance with the bi-directional flag bit, whether a bi-directional tunnel or a unidirectional tunnel is to be created; and in a case where the PCC determine the bi-directional tunnel is to be created, allocating a unique path label Path SID to the bi-directional tunnel, combining SR segments of nodes included in the bi-directional tunnel and the Path SID into a label stack, and delivering the label stack to a head node and a tail node among the nodes.

9. The method according to claim 8, wherein the SR tunnel create message carries the label stack composed of at least one label; and the label stack does not contain any SR path information, or contains SR path information in any direction.

10. The method according to claim 9, wherein when the label is the path label Path SID, the label contains SR path information in any direction;

wherein the SR path information in any direction comprises forward path information and/or reverse path information.

11. The method according to claim 8, wherein the method further comprises:

completing, by the PCC, association and binding of the bi-directional path according to the forward path information and/or the reverse path information carried in the SR tunnel create message, and generating a corresponding forwarding table, wherein each of the nodes encapsulates and forwards a corresponding packet according to the forwarding table.

12. The method according to claim 8, wherein the Path SID is different from a Node SID and an Adj SID which are delivered to a head node of a service path.

13. The method according to claim 8, further comprises:

reporting, by the PCC, a real-time status to the PCE via a PCRpt message in which status information of the bi-directional tunnel and current tunnel path information are carried, upon detecting a status change.

14. The method according to claim 8, further comprises:

parsing a specific label value and direction from a PCUpd message received from the PCE, generating a forwarding table, and completing modification of the bi-directional tunnel, by the PCC.

15. A path computation element (PCE) for creating a bi-directional segment routing (SR) tunnel, comprising: a processor, and a memory storing a computer program executable on the processor, wherein the processor is configured to, when executing the computer program, perform the method according to claim 1.

16. A non-transitory computer-readable storage medium storing a computer executable instruction thereon, the computer executable instruction cause, when executed by a processor, the processor to perform the method according to claim 1.

17. A path computation client (PCC) for creating a bi-directional segment routing (SR) tunnel, comprising: a processor, and a memory storing a computer program executable on the processor, wherein the processor is configured to, when executing the computer program, perform the method according to claim 8.

18. A non-transitory computer-readable storage medium storing a computer executable instruction thereon, the computer executable instruction cause, when executed by a processor, the processor to perform the method according to claim 8.

* * * * *